United States Patent [19]

Herzig et al.

[11] Patent Number: 5,231,157

[45] Date of Patent: Jul. 27, 1993

[54] SILOXANE COPOLYMERS CONTAINING ALKENYLOXY GROUPS, A PROCESS FOR PREPARING THE SAME AND THEIR USE

[75] Inventors: Christian Herzig, Taching; Doris Gilch, Eggenfelden, both of Fed. Rep. of Germany

[73] Assignee: Wacker-Chemie GmbH, Munich, Fed. Rep. of Germany

[21] Appl. No.: 648,107

[22] Filed: Jan. 31, 1991

[30] Foreign Application Priority Data

Feb. 1, 1990 [DE] Fed. Rep. of Germany ....... 4002922

[51] Int. Cl.$^5$ ............................................. C08G 77/06
[52] U.S. Cl. ........................................ 528/15; 528/26; 528/29; 528/34; 522/99; 522/148; 522/172; 427/515; 428/447
[58] Field of Search ................... 528/15, 26, 29, 34; 522/148, 172, 99; 428/447; 427/54.1

[56] References Cited

U.S. PATENT DOCUMENTS 4,208,319 6/1980 August et al. ...................... 524/368
4,311,821 1/1982 Weitemeyer et al. ............... 524/24

Primary Examiner—Melvyn I. Marquis

[57] ABSTRACT

Novel siloxane copolymers are described having an average of at least two alkenyloxy groups of the formula $$-OCR^2=CH^2CH_3,$$

in which $R^2$ represents hydrogen or a methyl radical.

These siloxane copolymers are prepared by reacting in a first stage, an organic compound (1) containing more than two aliphatic double bonds of the formula $OCHR^2CR^2=CH_2$ where $R^2$ is the same as above, with an organopolysiloxane (2) having at least one Si-bonded hydrogen atom per molecule in the presence of a catalyst (3) which promotes addition of the Si-bonded hydrogen to an aliphatic double bond and in a second stage heating the siloxane copolymer in the presence of a catalyst (4) which promotes shifting of the terminal double bond to form copolymers having an internal double bond.

9 Claims, No Drawings

SILOXANE COPOLYMERS CONTAINING ALKENYLOXY GROUPS, A PROCESS FOR PREPARING THE SAME AND THEIR USE

The present invention relates to siloxane copolymers and more particularly to siloxane copolymers containing alkenyloxy groups and to a process for preparing the same. The invention furthermore relates to the use of the siloxane copolymers containing alkenyloxy groups in compositions which can be crosslinked by means of light.

BACKGROUND OF THE INVENTION

Organopolysiloxanes which contain at least one Si-bonded vinyloxy-functional group per molecule of the formula $$H_2C=CH-O-G-$$

which G is an alkylene radical or represents an alkylene radical which is interrupted by a divalent hetero atom or a combination of hetero atoms, are known from U.S. Pat. No. 4,617,238 (published Oct. 14, 1986, J.V. Crivello et al., General Electric Company). Compositions which can be cross-linked by means of light and which contain the organopolysiloxanes mentioned above, and onium salts which catalyze the cationic polymerization of these organopolysiloxanes are described in U.S. Pat. No. 4,617,238.

The reaction of an organic compound containing four aliphatic double bonds, such as, for example, tetraallyloxyethane, with a silane containing Si-bonded hydrogen in the presence of a catalyst which promotes the addition of the Si-bonded hydrogen atom to an aliphatic double bond is described in U.S. Pat. No. 4,208,319 (published Jun. 18, 1980, P. August et al, Wacker-Chemie GmbH). Yields of organosilane containing 3 aliphatic double bonds of practically 100% of theory are obtained in this reaction. The organosilanes thus obtained are used as reinforcing additives in compositions which are based on organic polymers and fillers and can be crosslinked by means of sulfur or free radicals.

It is an object of the present invention to provide siloxane copolymers which contain alkenyloxy groups. Another object of the present invention is to provide a process for preparing siloxane copolymers containing alkenyloxy groups which allows for the introduction of more than one alkenyloxy group to a silicon atom. A further object of the present invention is to provide siloxane copolymers containing alkenyloxy groups which crosslink rapidly in the presence of light, especially ultraviolet light, to undergo cationic polymerization.

SUMMARY OF THE INVENTION

The foregoing objects and others which will become apparent from the following description are accomplished in accordance with this invention, generally speaking, by providing alkenyloxy containing siloxane copolymers having (a) siloxane units of the formula $$R_aSi(OR^1)_bO_{\frac{4-(a+b)}{2}} \tag{I}$$

in which R represents the same or different hydrocarbon radicals having from 1 to 18 carbon atom(s) per radical or halogenated hydrocarbon radicals having from 1 to 18 carbon atom(s) per radical, $R^1$ represents the same or different alkyl radicals which have from 1 to 4 carbon atom(s) per radical and can be substituted by an ether oxygen atom, a is 0, 1, 2 or 3, b is 0, 1, 2 or 3 and the sum of a+b is not greater than 3, (b) at least one siloxane unit per molecule of the formula $$QR_cSiO_{\frac{4-(c+1)}{2}} \tag{II}$$

in which R is the same as above, c is 0, 1 or 2 and Q represents a radical of the formula $$-CH_2CHR^2CHR^2OY(OCR^2=CR^2CH_3)_{x-1}$$

in which $R^2$ is the same or different and represents a hydrogen atom or a methyl radical, Y represents a trivalent, tetravalent, pentavalent or hexavalent hydrocarbon radical which has from 2 to 20 carbon atoms per radical and can be substituted by groups of the formula $$-OH,$$

$$-OR^3,$$

$$-OSiR^4_3,$$

$$-OCR^3,$$
$$\parallel$$
$$O$$

or can be interrupted by at least one oxygen atom or sulfur atom or one carbonyl group, or Y represents a trivalent radical of the formula $$\equiv P, \equiv P=O \text{ or } \equiv SiR^5$$

in which $R^3$ represents an alkyl radical having from 1 to 6 carbon atom(s) per radical, $R^4$ represents a methyl, ethyl, isopropyl, tert-butyl or phenyl radical, X represents a halogen atom and $R^5$ represents a monovalent hydrocarbon radical having from 1 to 8 carbon atom(s) per radical, or Y represents a tetravalent element, such as $$-\overset{|}{\underset{|}{C}}-, \quad -\overset{|}{\underset{|}{Si}}- \text{ or } -\overset{|}{\underset{|}{Ti}}-$$

x is 3, 4, 5 or 6, and optionally (c) at least one unit per molecule selected from the group of units of the formula $$O_{\frac{4-(c+1)}{2}}R_cSi-Q^1-SiR_cO_{\frac{4-(c+1)}{2}} \tag{III}$$

$$O_{\frac{4-(c+1)}{2}}R_cSi-Q^2-SiR_cO_{\frac{4-(c+1)}{2}} \tag{IV}$$
$$\underset{\displaystyle SiR_cO_{\frac{4-(c+1)}{2}}}{|}$$

and

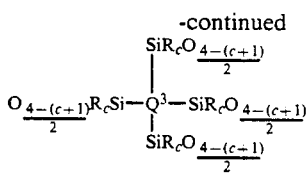  (V)

in which R and c are the same as above, $Q^1$ represents a radical of the formula

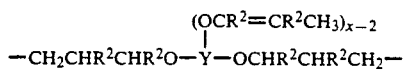

$Q^2$ represents a radical of the formula

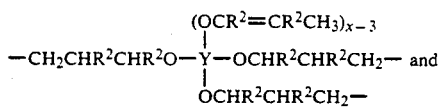

$Q^3$ represents a radical of the formula

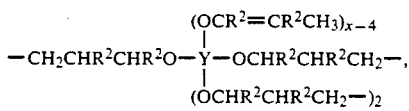

$(x - 4 \geq 0)$ in which $R_2$, Y and x are the same as above.

DESCRIPTION OF THE INVENTION

The siloxane copolymers containing alkenyloxy groups preferably contain siloxane units of formula (I), at least one siloxane unit per molecule of formula (II) and at least one unit per molecule selected from the group comprising units of formula (III), (IV) and (V).

The invention also relates to a process for preparing siloxane copolymers containing alkenyloxy groups, which comprises, in a 1st stage, reacting an organic compound (1) containing more than two aliphatic double bonds, of the general formula $$Y(OCHR^2 CR^2=CH_2)_x$$

in which $R^2$, Y and x are the same as above, with an organopolysiloxane (2) having at least one Si-bonded hydrogen atom per molecule in the presence of a catalyst (3) which promotes the addition of Si-bonded hydrogen to an aliphatic double bond, the ratio employed for the aliphatic double bond in the organic compound (1) to the Si-bonded hydrogen in the organopolysiloxane (2) being a ratio such that siloxane copolymers which contain alkenyl groups and have an average of more than two alkenyl groups A of the formula

in which $R^2$ is the same as above, are obtained, and then, in a 2nd stage, transferring the double bond in the alkenyl groups A to the carbon atom adjacent to the ether oxygen atom by heating the siloxane copolymer containing alkenyl groups obtained in the 1st stage in the presence of a catlyst (4) which promotes such a transfer of the double bond, siloxane copolymers which contain alkenyloxy groups and have an average of more than two alkenyloxy groups B of the formula

in which $R^2$ is the same as above, are obtained.

Preferably, x is 3 or 4 and Y is a trivalent or tetravalent radical.

The organopolysiloxanes of this invention containing alkenyloxy groups preferably have a viscosity of from 5 to $5 \times 10^5$ mPa.s at 25° C., and more preferably from 50 to 50,000 mPa.s at 25° C.

Examples of radicals represented by R are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals; and aralkyl radicals, such as the benzyl radical and the α- and β-phenethyl radical. The methyl radical is an example of the preferred radical.

Examples of halogenated radicals represented by R are halogenoalkyl radicals, such as the 3,3,3-trifluoro-n-propyl radical, the 2,2,2,2',2',2'-hexafluoroisopropyl radical and the heptafluoroisopropyl radical, and halogenaryl radicals, such as the o-, m- and p-chlorophenyl radical.

Examples of alkyl radicals represented by $R^1$ are the methyl, ethyl, n-propyl, iso-propyl, 1-n-butyl, 2-n-butyl, iso-butyl and tert-butyl radical. The methyl and ethyl radicals are the preferred radicals. Examples of alkyl radicals represented by $R^1$ which are substituted by an ether oxygen atom are the methoxyethyl and ethoxyethyl radicals.

The radical represented by $R^2$ is preferably a hydrogen atom.

Examples of alkyl radicals represented by $R^3$ are the methyl, ethyl, n-propyl, iso-propyl, 1-n-butyl, 2-n-butyl, iso-butyl, tert-butyl-, n-pentyl, iso-pentyl, neo-pentyl and tert-pentyl radical and hexyl radicals, such as the n-hexyl radical.

Examples of radicals represented by $R^5$ are alkyl radicals, such as the methyl, ethyl, n-propyl, iso-propyl, 1-n-butyl, 2-n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical, and iso-octyl radicals, such as the 2,2,4-trimethylpentyl radical, alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl radical; alkaryl radicals, such as o-, m- and p-tolyl radicals, xylyl radicals and ethylphenyl radicals; and aralkyl radicals, such as the benzyl radical and the α- and β-phenethyl radical.

Preferred siloxane copolymers containing alkenyloxy groups are those which contain (a) siloxane units of the formula $$R_2SiO \qquad (I')$$

(b) at least two siloxane units per molecule of the formula $$QR_2SiO_{\frac{1}{2}} \qquad (II')$$

and (c) at least one unit per molecule of the formula $$O_{\frac{1}{2}}R_2SiQ^1SiR_2O_{\frac{1}{2}} \qquad (III')$$

in which R, Q and $Q^1$ are the same as above.

Examples of the organic compound (1) which contains more than two aliphatic double bonds and is employed in the 1st stage of the process of this invention are those of the formula

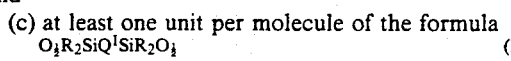

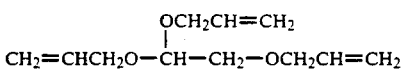

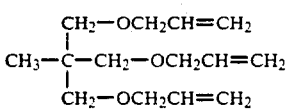

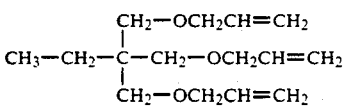

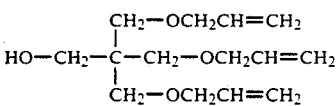

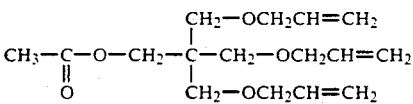

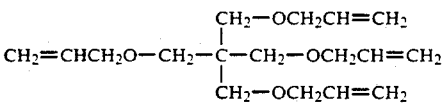

(CH$_2$=CHCH$_2$O)$_2$CHCH(OCH$_2$CH=CH$_2$)$_2$ (CH$_2$=CHCH$_2$O)$_2$CHCH$_2$CH(OCH$_2$CH=CH$_2$)$_2$

CH$_3$C(OCH$_2$CH=CH$_2$)$_3$

C(OCH$_2$CH=CH$_2$)$_4$ (CH$_2$=CHCH$_2$O)CH$_2$[CH(OCH$_2$CH=CH$_2$)]$_3$CH$_2$(OCH$_2$CH=CH$_2$)

(CH$_2$=CHCH$_2$O)CH$_2$[CH(OCH$_2$CH=CH$_2$)]$_4$CH$_2$(OCH$_2$CH=CH$_2$)

Si(OCH$_2$CH=CH$_2$)$_4$

Si[OCH(CH$_3$)CH=CH$_2$]$_4$

P(OCH$_2$CH=CH$_2$)$_3$,

O=P(OCH$_2$CH=CH$_2$)$_3$ and (R$^6$O—CH$_2$—)$_{4-k}$C(—CH$_2$—OCH$_2$CH=CH$_2$)$_k$ in which $R^6$ represents hydrogen or a radical of the formula

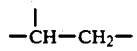

and k is an average of from 2.5 to 3.5, and more preferably about 2.9. The last mentioned compound is the preferred example.

Examples of the radical represented by Y are those of the formula

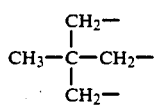

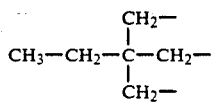

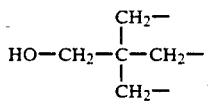

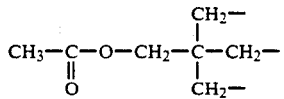

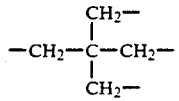

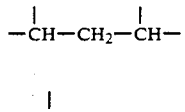

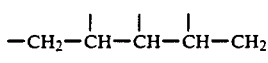

≡P and ≡P=O.

Processes for preparing organic compound (1) are described in EP-B 46,731 (published Oct. 3, 1984, F.

Lohse et al., Ciba-Geigy AG). The compound of the formula $$(HOCH_2)_{4-k}C(CH_2OCH_2CH=CH_2)_k$$

in which k is 2.9, is commercially available, for example from Shell AG and is marketed as pentaerythritol triallyl ether. The compound of the formula $$(CH_3\overset{\underset{\displaystyle\|}{O}}{C}OCH_2)_{4-k}C(CH_2OCH_2CH=CH_2)_k,$$

in which k is an average of from 2.5 to 3.5, and more preferably about 2.9, is obtained by reacting the compound mentioned above with acetic anhydride or isopropenyl acetate.

Organosiloxanes (2) having at least one Si-bonded hydrogen atom which are preferably employed in the 1st stage of the process of this invention are those of the general formula $$H_eR_fSiO_{\frac{4-(e+f)}{2}} \qquad (VI)$$

in which R is the same as above, e is 0 or 1, with an average of from 0.005 to 1.0, f is 0, 1, 2 or 3, with an average of from 1.0 to 2.0, and the sum of e+f is not greater than 3.

Organopolysiloxanes (2) having at least one Si-bonded hydrogen atom which are preferably employed in the process of this invention are those of the general formula $$H_dR_{3-d}SiO(SiR_2O)_o(SiRHO)_pSiR_{3-d}H_d \qquad (VII)$$

in which R is the same as above, d is 0 or 1, o is 0 or an integer of from 1 to 1,000 and p is 0 or an integer of from 1 to 6.

The organopolysiloxanes (2) having at least one Si-bonded hydrogen atom per molecule preferably have a viscosity of from 0.5 to 20,000 mPa.s at 25° C., and more preferably from to 1,000 mPa.s at 25° C.

Examples of organopolysiloxanes (2) are copolymers of dimethylhydrogensiloxane and dimethylsiloxane units, copolymers of dimethylhydrogensiloxane, dimethylsiloxane and methylhydrogensiloxane units, copolymers of trimethylsiloxane and methylhydrogensiloxane units, copolymers of trimethylsiloxane, dimethylsiloxane and methylhydrogensiloxane units, copolymers of dimethylhydrogensiloxane, dimethylsiloxane and phenylmethylsiloxane units, copolymers of dimethylhydrogensiloxane and methylsiloxane units and copolymers of dimethylhydrogensiloxane and phenylsiloxane units, copolymers of methylhydrogensiloxane and diphenylsiloxane units, copolymers of methylhydrogensiloxane, dimethylsiloxane and phenylsiloxane units and copolymers of dimethylhydrogensiloxane, dimethylsiloxane and phenylsiloxane units.

Processes for preparing organopolysiloxanes having at least one Si-bonded hydrogen atom per molecule, including those of the preferred type, are generally known.

The organic compound (1) is employed in the process of this invention in amounts such that the ratio of the aliphatic double bond in the organic compound (1) to the Si-bonded hydrogen in the organopolysiloxane (2) is preferably from 1.5:1 to 20:1, and more preferably from 2:1 to 10:1. The organic compound (1) can be combined with the organopolysiloxane (2) almost as desired within very wide limits, depending on their functionality and their molecular weight. However, a C=C:SiH ratio of greater than 20:1 leads exclusively to monohydrosilylation of the organic compound (1), which is not preferred.

The same catalysts which have been or could have been employed to promote the addition of Si-bonded hydrogen to an aliphatic double bond can also be used as catalysts (3) which promote the addition of Si-bonded hydrogen to an aliphatic multiple bond in the 1st stage of the process of this invention. The catalysts (3) are preferably a metal from the group of platinum metals or a compound or a complex from the group of platinum metals. Examples of such catalysts are metallic and finely divided platinum, which can be supported on inert carriers, such as silicon dioxide, aluminum oxide or active charcoal, and compounds or complexes of platinum, such as platinum halides, for example $PtCl_4$, $H_2PtCl_6.6H_2O$, $Na_2PtCl_4.4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6.6H_2O$ and cyclohexanone, platinum-vinylsiloxane complexes, such as platinum-1,3-divinyl-1,1,3,3-tetramethyldisiloxane complexes which contain or are free of detectable inorganically bonded halogen, bis-(gamma-picoline)-platinum dichloride, trimethylenedipyridineplatinum dichloride, dicyclopentadieneplatinum dichloride, dimethylsulfoxide-ethyleneplatinum-(II)-dichloride and reaction products of platinum tetrachloride with an olefin and primary amine or secondary amine or a primary and secondary amine according to U.S. Pat. No. 4,292,434, such as the reaction product of platinumtetrachloride dissolved in 1-octene with sec-butylamine, or ammonium-platinum complexes according to EP-B 110,370.

Catalyst (3) is preferably employed in amounts of from 0.5 to 1,000 ppm by weight (parts by weight per million parts by weight), calculated as elemental platinum and based on the total weight of the organic compound (1) and organopolysiloxane (2).

The addition reaction (or hydrosilylation reaction) in the 1st stage of the process of this invention is preferably carried out under the pressure of the surrounding atmosphere, that is, at about 1020 hPa (absolute), but it can also be carried out under higher or lower pressures. The hydrosilylation is preferably carried out at a temperature of from 50° C. to 150° C., and more preferably from 80° C to 130° C.

Inert organic solvents can also be used in the 1st stage of the process of this invention, although the additional use of inert organic solvents is not preferred. Examples of inert organic solvents are toluene, xylene, octane isomers, butyl acetate, 1,2-dimethoxyethane, tetrahydrofuran and cyclohexane.

Excess organic compound (1) and the inert organic solvent, if used, are preferably removed by distillation from the siloxane copolymer which contains alkenyl groups and has been prepared in the 1st stage of the process of this invention.

The siloxane copolymers which contain alkenyl groups and have been obtained in the 1st stage of the process of this invention are described in our patent application filed on the same date.

In the 2nd stage of the process of this invention, the double bond in the alkenyl groups A of the formula

—OCHR$^2$CR$^2$=CH$_2$ is shifted to the carbon atom adjacent to the ether oxygen atom in the presence of catalysts (4) which promote this double bond transfer.

The same catalysts (4) which have been or could have been used for promoting such a shift of the double bond can be employed in the 2nd stage of the process of this invention. Examples of catalysts (4) are metallic or finely divided platinum, ruthenium, rhodium and palladium, which may be supported on inert carriers, such as active charcoal, and compounds or complexes of these elements which are soluble in the siloxane copolymers which contain alkenyl groups and have been obtained in the 1st stage of the process of this invention or which are fixed on supports, such as active charcoal or polymeric phosphine ligands. Examples of preferred catalysts (4) are those of the formula RuCl$_2$(PPh$_3$)$_3$, RuHCl(PPh$_3$)$_3$, RuHCl(CO)(PPh$_3$)$_3$, RuH$_2$(CO)(PPh$_3$)$_3$ and RuH$_2$(PPh$_3$)$_4$.

The catalyst (4) is preferably employed in amounts of from 0.1 to 1,000 ppm by weight, and more preferably from 5 to 100 ppm by weight, calculated as the elemental metal and based on the total weight of the organic compound (1) and organopolysiloxane (2).

Strong bases, such as potassium tert-butylate, can also be used as catalysts (4), but these are not preferred because of the high amounts used. The shift of double bonds using these strong bases is described in C.C. Price, JACS 83,1772 (1961) and G. Kesslin, J. Org. Chem. 31, 2682 (1966).

To shift the double bond to the carbon atom adjacent to the ether oxygen atom in the alkenyl groups A, the siloxane copolymer which contains alkenyl groups and has been obtained from the 1st stage of the process of this invention is mixed with the catalyst (4) and the mixture is heated. The reaction is preferably carried out at a temperature of from 80° C. to 200° C. and more preferably from 120° C. to 150° C., preferably under the pressure of the surrounding atmosphere, that is, at about 1020 hPa (absolute), and preferably over a period of from 0.5 to 20 hours, and more preferably from 4 to 10 hours. Preferably, no solvent is used.

If the organic compound (1) is not removed by distillation in the 1st stage of the process of this invention, the alkenyl groups A in the organic compound (1) are also rearranged into alkenyloxy groups B. The rearranged organic compound (1) can be removed by distillation from the siloxane copolymers which contain alkenyloxy groups and have been prepared in the 2nd stage of the process of this invention. If it is not removed, it is capable of undergoing cationic polymerization or copolymerization with the alkenyloxy groups of the siloxane copolymer because of its content of alkenyloxy groups B.

The siloxane copolymer which contains alkenyloxy groups and is obtained in the 2nd stage of the process of this invention is a cis/trans isomer mixture in respect to the alkenyloxy groups, the cis isomers usually predominating. For example, if the alkenyloxy group is a 1-propenyloxypropyl radical, the following isomeric mixture is present:

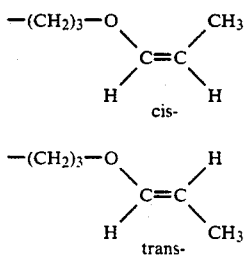

The 2-stage process of this invention proceeds in accordance with the following equation, shown by way of example by the use of pentaerythritol-triallyl ether-acetate as the organic compound (1) and an α,w-dihydrogendimethyl-polysiloxane as the organopolysiloxane (2):

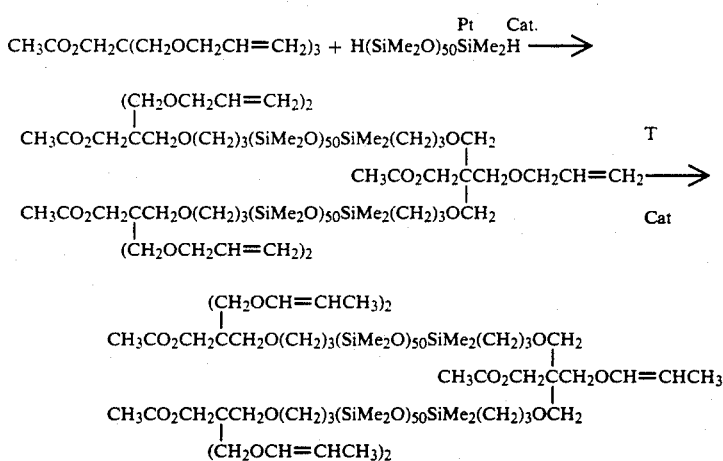

The course of the reaction and therefore the resulting end product is totally dependent on the ratio of C=C double bond in the organic compound (1) to Si-bonded hydrogen in the organopolysiloxane (2) which is employed in the 1st stage. Depending on the ratio of C=C:SiH employed, it is always necessary for the ratio of C=C:SiH to be greater than 1, siloxane copolymers are obtained which contain free alkenyl groups A of the formula —OCHR$^2$CR$^2$=CH$_2$, such as —OCH$_2$CH=CH$_2$ at the chain end and along the chain, it being possible for branching to occur along the chain by further reaction of the free alkenyl groups along the chain with the Si-bonded hydrogen atoms of the organopolysiloxane (2). In the 2nd stage, the double bond in the free alkenyl groups A is then shifted and free alkenyloxy groups B of the formula —OCR²=CR²CH₃, such as —OCH=CHCH₃ are obtained. The allyloxy groups, —OCH₂CH=CH₂, have already been rearranged into propenyloxy groups, —OCH=CHCH₃, to a small degree (up to 15 mol %) in the 1st stage in the presence of the platinum catalysts, so that in the 2nd stage an equilibrium is established between allyloxy and propenyloxy groups, in that the ratio of allyloxy groups to propenyloxy groups is usually 4:96, that is, a conversion of about 96% is achieved in respect of the propenyloxy groups.

The various stages of the process of this invention can be carried out in one and the same reaction vessel in succession or in reaction vessels which are separate from each other. They are preferably carried out in one and the same reaction vessel in succession. The process of this invention can be carried out batchwise, semicontinuously or continuously.

The siloxane copolymers of this invention containing alkenyloxy groups can be crosslinked in a cationic polymerization initiated by light. The bis-(dodecylphenyl)iodonium salts described in U.S. Pat. No. 4,279,717 (published Jul. 21, 1981, Eckberg et al., General Electric Company), such as bis-(dodecylphenyl)iodonium hexafluoroantimonate or bis-(dodecylphenyl)iodonium hexafluoroarsenate, can be used, for example, as catalysts for the crosslinking initiated by light.

The invention therefore relates to the use of siloxane copolymers which contain alkenyloxy groups and preferably contain units of the formula (I), (II) and if appropriate at least one of the units of the formula (III), (IV), or (V), preferably units of the formula (I'), (II') and (III'), in compositions which are based on the siloxane copolymers mentioned above and can be crosslinked by light.

The siloxane copolymers of this invention containing alkenyloxy groups are preferably crosslinked by ultraviolet light, that having wavelengths in the range of from 200 to 400 nm being preferred. The ultraviolet light can be generated, for example, in xenon lamps or low pressure, medium pressure or high pressure mercury lamps. Light having a wavelength of 400 to 600 nm, that is to say so-called "halogen light", is also suitable for the crosslinking by means of light. The siloxane copolymers of this invention containing alkenyloxy groups can be crosslinked by light in the visible range if commercially available photosensitizers are used.

The cationic polymerization of the siloxane copolymers of this invention containing alkenyloxy groups can of course also be initiated by Brönsted or Lewis acids.

The invention also relates to the use of the siloxane copolymers of this invention containing alkenyloxy groups for the preparation of coatings which can be crosslinked by light.

Examples of surfaces to which the coatings of this invention can be applied are those of paper, wood, cork, plastic films, for example polyethylene films or polypropylene films, ceramic objects, glass, including glass fibers, metals, paperboard, including that of asbestos, and woven and nonwoven cloth of natural or synthetic organic fibers.

The application of the siloxane copolymers of this invention containing alkenyloxy groups to the surfaces to be coated can be carried out in any desired manner which is suitable and in many cases known for the production of coatings from liquid substances, for example by dipping, brushing, pouring, spraying, rolling on, printing, for example by means of an offset gravure transfer device, and knife or doctor-blade coating.

EXAMPLE 1

About 89 g of 1,1,2,2-tetraallyloxyethane are mixed with 5.4 mg of platinum as a solution of platinum tetrachloride in 1-octene and the mixture is heated to 110° C. About 581 g of an α,w-dihydrogendimethylpolysiloxane which contains 250 mg of Si-bonded hydrogen are added dropwise to this mixture at 110° C. under a nitrogen atmosphere, with stirring. After the mixture has been stirred at 110° C. for about 3 hours, 98% of the Si-bonded hydrogen atoms of the α,w-dihydrogendimethylpolysiloxane have reacted. All the volatile constituents are then removed by distillation at 120° C. under 10⁻³ hPa. About 110 mg of RuHCl(Ph₃P)₃ are then added to the reaction product at 130° C. under 1020 hPa (absolute) under a nitrogen atmosphere and the mixture is stirred at 130° C. for 16 hours. A clear yellow liquid having a viscosity of about 1100 mPa.s at 25° C. is obtained. The siloxane copolymer thus obtained essentially contains, in addition to dimethylsiloxane units, siloxane units of the formula

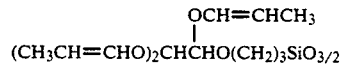

and bridged units of the formula

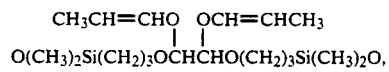

the ratio of cis isomer to trans isomer in the 1-propenyloxy groups, CH₃CH=CHO—, being 70:30 according to the ¹H-NMR spectrum. The siloxane copolymer containing 1-propenyloxy groups has an equivalent weight of about 1300 g per mol of C=C double bond.

EXAMPLE 2

About 114.4 g of trimethyolpropane-allyl ether (prepared in accordance with EP-B 46,731) having an iodine number (number which specifies how many g of iodine are bonded by 100 g of substance) of 266 are mixed with 3.8 mg of platinum in the form of a solution of platinum tetrachloride in 1-octene and the mixture is heated to 105° C. About 273 g of an α,w-dihydrogendimethylpolysiloxane which contains 0.6 g of Si-bonded hydrogen are added dropwise to this mixture at 105° C. under a nitrogen atmosphere, while stirring. After the mixture has been stirred at 105° C. for about 4 hours, 99% of the Si-bonded hydrogen atoms of the α,w-dihydrogenmethylpolysiloxane have reacted. All the volatile constituents are then removed by distillation at 120° C. under 10⁻³ hPa. About 200 ppm by weight of RuHCl(Ph₃P)₃ are then added to the reaction product at 130° C. under 1020 hPa (absolute) under a nitrogen atmosphere and the mixture is stirred at 130° C. for 8 hours. About 315 g of a clear, almost colorless oil having a viscosity of 380 mm²×s⁻¹ at 25° C. are obtained. The siloxane copolymer containing 1-propenyloxy groups, which is obtained in this manner, has an equivalent weight of about 900 g per mol of C═C double bond.

EXAMPLE 3

About 48 g of pentaerythritol-triallyl ether having an iodine number of 281 (commercially obtainable from Shell) are mixed with 2.2 mg of platinum as a solution of platinum tetrachloride in 1-octene and the mixture is heated to 105° C. About 435 g of an α,w-dihydrogendimethylpolysiloxane which contains 0.046% by weight of Si-bonded hydrogen are added dropwise to this mixture at 105° C. under a nitrogen atmosphere, with stirring. After the mixture has been stirred at 105° C. for about 8 hours, 98% of the Si-bonded hydrogen atoms of the α,w-dihydrogendimethylpolysiloxane have reacted. All the volatile constituents are then removed by distillation at 120° C. under $10^{-3}$ hPa. After filtration, 76 mg of RuHCl(Ph₃P)₃ are then added to the reaction product at 130° C. under 1020 hPa (absolute) under a nitrogen atmosphere and the mixture is stirred at 130° C. for 8 hours. A siloxane copolymer is obtained which contains 1-propenyloxy groups and has a viscosity of 1190 mm2×s⁻¹, contains one 1-propenyloxy group per 32 silicon atoms and has an equivalent weight of about 2400 g per mol of C═C double bond. The ratio of cis isomer to trans isomer in the 1-propenyloxy groups is 70:30. The following data are obtained from the ¹H-NMR spectrum:

¹H-NMR spectrum (CDCl₃):

trans isomer: δ = 4.78 ppm (1H. CH₃C<u>H</u>═),
(30 mol %)    6.22 ppm (1H. ═C<u>H</u>—O—).
cis isomer:   δ = 4.37 ppm (1H. CH₃C<u>H</u>═).
(70 mol %)    5.95 ppm (1H. ═C<u>H</u>—0—).

EXAMPLE 4

About 2 g of a 50% solution of bis-(dodecylphenyl)iodonium hexafluorantimonate which has been prepared according to U.S. Pat. No. 4,279,717 in propylene carbonate are added to 100 g of the siloxane copolymer prepared in Example 3. The mixture is applied at a thickness of 3μ, using a glass rod, to paper coated with polyethylene. Two medium pressure mercury lamps having an output of 80 watt/cm luminous length are positioned at a distance of 10 cm from the coated substrate. After UV exposure for less than two seconds, a non-tacky coating is obtained which is adhesive-repellent with respect to paper labels coated with acrylate adhesive.

What is claimed is:

1. A siloxane copolymer which contains alkenyloxy groups and contains
   (a) siloxane units of the formula $$R_aSi(OR^1)_bO_{\frac{4-(a+b)}{2}} \quad (I)$$

in which R is selected from the group consisting of hydrocarbon radicals having from 1 to 18 carbon atom(s) per radical and halogenated hydrocarbon radicals having from 1 to 18 carbon atom(s) per radical, R¹ is an alkyl radical having from 1 to 4 carbon atom(s) per radical which can be substituted by an ether oxygen atom, a is 0, 1, 2 or 3, b is 0, 1, 2 or 3 and the sum of a+b is not greater than 3, (b) at least one siloxane unit per molecule of the formula $$QR_cSiO_{\frac{4-(c+1)}{2}} \quad (II)$$

in which R is the same as above, c is 0, 1 or 2 and Q represents a radical of the formula

—CH₂CHR²CHR²OY(OCR²═CR²CH₃)ₓ₋₁ in which R² is a radical selected from the group consisting of a hydrogen atom or a methyl radical, Y is a trivalent, tetravalent, pentavalent or hexavalent hydrocarbon radical having from 2 to 20 carbon atoms per radical which can be substituted with a group from the formula

—OH,

—OR³,

—OSiR⁴₃,

—OCR³, or
     ‖
     O

—X, or can be interrupted by at least one oxygen atom or sulfur atom or one carbonyl group, or Y represents a trivalent radical of the formula ≡P, ≡P═O or ≡SiR⁵ in which R³ is an alkyl radical having from 1 to 6 carbon atom(s) per radical, R⁴ is a radical selected from the group consisting of a methyl, ethyl, isopropyl, tert-butyl and phenyl radical, X is a halogen atom, and R⁵ is a monovalent hydrocarbon radical having from 1 to 8 carbon atom(s) per radical, or Y represents a tetravalent element selected from the group consisting of $$-\overset{|}{\underset{|}{C}}-, \quad -\overset{|}{\underset{|}{Si}}- \quad \text{and} \quad -\overset{|}{\underset{|}{Ti}}-,$$

and x is 3, 4, 5 or 6 and optionally
   (c) at least one unit per molecule selected from the group consisting of units of the formula $$O_{\frac{4-(c+1)}{2}}R_cSi-Q^1-SiR_cO_{\frac{4-(c+1)}{2}} \quad (III)$$

$$O_{\frac{4-(c+1)}{2}}R_cSi-Q^2-SiR_cO_{\frac{4-(c+1)}{2}} \quad (IV)$$
   $$\qquad\qquad\quad |$$
   $$\qquad\qquad SiR_cO_{\frac{4-(c+1)}{2}}$$

and

-continued

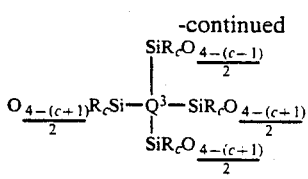  (V)

in which R and c are the same as above, $Q^1$ represents a radical of the formula

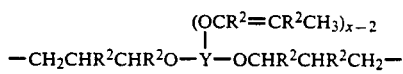

$Q^2$ represents a radical of the formula

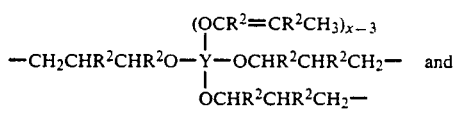  and $Q^3$ represents a radical of the formula

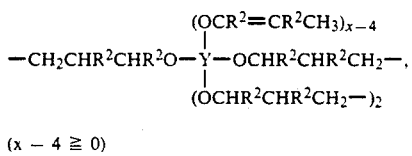

$(x - 4 \geq 0)$ in which $R^2$, Y and x are the same as above

2. The siloxane copolymer containing alkenyloxy groups of claim 1, which contains siloxane units of formula (I), at least one siloxane unit per molecule of formula (II) and at least one unit per molecule selected from the group consisting of units of formulas (III), (IV) and (V).

3. The siloxane copolymer containing alkenyloxy groups of claim 1 which contains
(a) siloxane units represented by the formula $R_2SiO$  (I')

(b) at least two siloxane units per molecule represented by the formula $QR_2SiO_{\frac{1}{2}}$  (II') and (c) at least one siloxane unit per molecule represented by formula $O_{\frac{1}{2}}R_2SiQ^1SiR_2O_{\frac{1}{2}}$  (III')

in which R is selected from the group consisting of hydrocarbon radicals having from 1 to 18 carbon atom(s) per radical, and halogenated hydrocarbon radicals having from 1 to 18 carbon atom(s) per radical, Q is a radical of the formula $-CH_2-CHR^2CHR^2OY(OCR^2=Cr^2CH_3)_{x-1}$ $Q^1$ is a radical of the formula

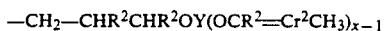

$R^2$ is a radical selected from the group consisting of a hydrogen atom and a methyl radical, x is 3, 4, 5 or 6 and Y is a trivalent, tetravalent, pentavalent or hexavalent hydrocarbon radical having from 2 to 20 carbon atoms per radical, which can be substituted by groups of the formula

—OH,

—$OR^3$,

—$OSiR^4_3$,

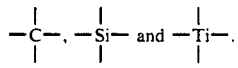

or can be interrupted by at least one oxygen atom or sulfur atom or one carbonyl group, or Y represents a trivalent radical of the formula $\equiv P$, $\equiv P=O$ or $\equiv SiR^5$ in which $R^3$ is an alkyl radical having from 1 to 6 carbon atom(s) per radical, $R^4$ is a radical selected from the group consisting of a methyl, ethyl, isopropyl, tert-butyl and phenyl radical, X is a halogen atom and $R^5$ is a monovalent hydrocarbon radical having from 1 to 8 carbon atom(s) per radical, or Y represents a tetravalent element selected from the group consisting of

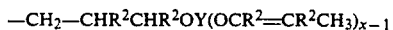

4. The siloxane copolymer containing alkenyloxy groups of claim 2 which contains (a) siloxane units represented by the formula $R_2SiO$  (I'), (b) at least two siloxane units per molecule of formula (II) represented by the formula $QR_2SiO_{\frac{1}{2}}$  (II') and (c) at least one siloxane unit per molecule of formula (III) represented by the formula $O_{\frac{1}{2}}R_2SiQ^1SiR_2O_{\frac{1}{2}}$  (III')

in which R is selected from the group consisting of hydrocarbon radicals having from 1 to 18 carbon atom(s) per radical, and halogenated hydrocarbon radicals having from 1 to 18 carbon atom(s) per radical, Q is a radical of the formula $-CH_2-CHR^2CHR^2OY(OCR^2=CR^2CH_3)_{x-1}$ $Q^1$ is a radical of the formula

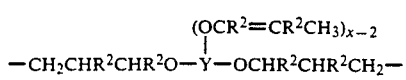

$R^2$ is a radical selected from the group consisting of a hydrogen atom and a methyl radical, x is 3, 4, 5 or 6 and Y is a trivalent, tetravalent, pentavalent or hexavalent hydrocarbon radical having from 2 to 20 carbon atoms per radical, which can be substituted by groups of the formula

—OH,

—OR$^3$,

—OSiR$^4{}_3$, $$-\text{OCR}^3\underset{\parallel}{\phantom{O}}\text{, or}$$
$$\phantom{-\text{OCR}^3}O$$

—X or can be interrupted by at least one oxygen atom or sulfur atom or one carbonyl group, or Y represents a trivalent radical of the formula $\equiv$P, $\equiv$P=O or $\equiv$SiR$^5$ in which $R^3$ is an alkyl radical having from 1 to 6 carbon atom(s) radical, $R^4$ is radical selected from the group consisting of a methyl, ethyl, isopropyl, tert-butyl and phenyl radical, X is a halogen atom and $R^5$ is a monovalent hydrocarbon radical having from 1 to 8 carbon atom(s) per radical, or Y represents a tetravalent element selected from the group consisting of $$-\underset{|}{\overset{|}{\text{C}}}-, -\underset{|}{\overset{|}{\text{Si}}}-\text{ and }-\underset{|}{\overset{|}{\text{Ti}}}-.$$

5. A process for preparing a siloxane copolymer containing alkenyloxy groups of claim 1, which comprises in a first stage reacting an organic compound (1) containing more than two aliphatic double bonds, of the general formula Y(OCHR$^2$CR$^2$=CH$_2$)$_x$ $R^2$ is a radical selected from the group consisting of a hydrogen atom and a methyl radical, x is 3, 4, 5 or 6 and Y is a trivalent, tetravalent, pentavalent or hexavalent hydrocarbon radical having from 2 to 20 carbon atoms per radical, which can be substituted by groups of the formula

—OH,

—OR$^3$,

—OSiR$^4{}_3$, $$-\text{OCR}^3\underset{\parallel}{\phantom{O}}\text{, or}$$
$$\phantom{-\text{OCR}^3}O$$

—X or can be interrupted by at least one oxygen atom or sulfur atom or one carbonyl group, or Y represents a trivalent radical of the formula $\equiv$P, $\equiv$P=X or $\equiv$SiR$^5$ in which $R^3$ is an alkyl radical having from 1 to 6 carbon atom(s) per radical, $R^4$ is a radical selected from the group consisting of a methyl, ethyl, isopropyl, tert-butyl and phenyl radical, X is a halogen atom and $R^5$ a monovalent hydrocarbon radical having from 1 to 8 carbon atom(s) per radical, or Y represents a tetravalent element selected from the group consisting of the, elements $$-\underset{|}{\overset{|}{\text{C}}}-, -\underset{|}{\overset{|}{\text{Si}}}-\text{ and }-\underset{|}{\overset{|}{\text{Ti}}}-.$$

an organopolysiloxane (2) having at least one Si-bonded hydrogen atom per molecule in the presence of a catalyst (3) which promotes the addition of Si-bonded hydrogen to an aliphatic double bond, in which the ratio of the aliphatic double bond in the organic compound (1) to the Si-bonded hydrogen in the organopolysiloxane (2) is such that siloxane copolymers are obtained which contain alkenyl groups and have an average of more than two alkenyl groups A of the formula

—OCHR$^2$CR$^2$=CH$_2$ in which $R^2$ is the same as above, and in a 2nd stage, shifting the double bond in the alkenyl groups A to the carbon atom adjacent to the either oxygen atom by heating the siloxane copolymer containing alkenyl groups obtained in the 1st stage in the presence of a catalyst (4) which promotes a shift of the double bond, in which siloxane copolymers are obtained which contain alkenyloxy groups and have an average of more than two alkenyloxy groups B of the formula

—OCR$^2$=CR$^2$CH$_3$, in which $R^2$ is the same as above.

6. The process of claim 5, wherein the organic compound (1) has the formula (R$^6$OCH$_2$)$_{4-k}$C(CH$_2$OCH$_2$CH=CH$_2$)$_k$, in which $R^6$ is selected from the group consisting of hydrogen and a radical of the formula $$\underset{\phantom{O}}{\overset{O}{\parallel}}$$
$$\text{CH}_3\text{C}-$$

$$\underset{\phantom{O}}{\overset{O}{\parallel}}$$
$$\text{CH}_3\text{C}-$$

and k is 3.

7. The process of claim 5, wherein the organopolysiloxane (2) having at least one Si-bonded hydrogen atom per molecule has the general formula H$_d$R$_{3-d}$SiO(SiR$_2$O)$_o$(SiRHO)$_p$SiR$_{3-d}$H$_d$     (VII)

in which R is a radical selected from the group consisting of hydrocarbon radicals having from 1 to 18 carbon atom(s) per radical and halogenated hydrocarbon radicals having from 1 to 18 carbon atom(s) per radical, d is 0 or 1, o is 0 or an integer of from 1 to 1000 and p is 0 or an integer of from 1 to 6.

8. A composition which can be crosslinked by means of light comprising the siloxane copolymer containing alkenyloxy groups of claim 1.

9. A coating which may be obtained by applying a composition which contains the siloxane copolymer containing alkenyloxy groups of claim 1 to a substrate and thereafter the coated substrate is exposed to light.

* * * * *

UNITED STATES PATENT AND TRADEMARK OFFICE
CERTIFICATE OF CORRECTION

PATENT NO. : 5,231,157
DATED : July 27, 1993
INVENTOR(S) : Christian Herzig and Doris Gilch It is certified that error appears in the above-identified patent and that said Letters Patent is hereby corrected as shown below:

Column 16, line 18, insert --- -X ---.

Column 17, delete lines 32 thru 38 and insert in lieu of
--- sents a tetravalent element selected from the group consisting of $$-\overset{|}{\underset{|}{C}}-, \quad -\overset{|}{\underset{|}{Si}}- \quad \text{and} \quad -\overset{|}{\underset{|}{Ti}}- \quad ---.$$

Column 18, line 1, delete "$\equiv P$, $\equiv P=X$ or $\equiv SiR^5$" and insert in lieu of
--- $\equiv P$, $\equiv P=O$ or $\equiv SiR^5$ ---.

Line 18, delete "an organopolysiloxane (2) having at least one Si-" and insert in lieu of --- with an organopolysiloxane (2) having at least one Si- ---.

Delete lines 58 to 60.

Signed and Sealed this

Twenty-sixth Day of April, 1994

Attest:

BRUCE LEHMAN

*Attesting Officer*    *Commissioner of Patents and Trademarks*